(12) United States Patent
Yang

(10) Patent No.: US 11,418,688 B2
(45) Date of Patent: Aug. 16, 2022

(54) CAMERA MODULE FOR USE IN AUTOMOBILE

(71) Applicant: LG INNOTEK CO., LTD., Seoul (KR)

(72) Inventor: Jun Suk Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/014,650

(22) Filed: Sep. 8, 2020

(65) Prior Publication Data

US 2020/0404133 A1   Dec. 24, 2020

Related U.S. Application Data

(63) Continuation of application No. 15/991,729, filed on May 29, 2018, now Pat. No. 10,805,513, which is a
(Continued)

(30) Foreign Application Priority Data

Oct. 17, 2014   (KR) .................... 10-2014-0140847

(51) Int. Cl.
*H04N 5/225*   (2006.01)
*B60R 1/00*   (2022.01)
(Continued)

(52) U.S. Cl.
CPC ......... *H04N 5/2257* (2013.01); *H04N 5/2252* (2013.01); *H04N 5/2253* (2013.01);
(Continued)

(58) Field of Classification Search
CPC .. H04N 5/2257; H04N 5/2252; H04N 5/2253; H04N 5/2254; B60R 1/00;
(Continued)

(56) References Cited

U.S. PATENT DOCUMENTS 5,879,289 A    3/1999   Yarush et al.
7,965,336 B2 *  6/2011   Bingle ................... H04N 5/374
                                                                348/374
(Continued)

FOREIGN PATENT DOCUMENTS

CN    101331753 A    12/2008
CN    102243360 A    11/2011
(Continued)

OTHER PUBLICATIONS

Notice of Allowance dated Sep. 13, 2016 in U.S. Appl. No. 14/823,492.
(Continued)

*Primary Examiner* — Shahbaz Nazrul
(74) *Attorney, Agent, or Firm* — Saliwanchik, Lloyd & Eisenschenk

(57) ABSTRACT

Embodiments provide a camera module including a lens unit, a first board formed with an electromagnetic circuit, a second board spaced apart from the first board, the second board including a terminal for external electrical connection and being formed with an electromagnetic circuit, a first support member having one side coupled to the first board and the other side coming into contact with one surface of the second board, so as to maintain a constant distance between the first board and the second board, and an electromagnetic-field shield configured to receive the first board and the second board therein, the electromagnetic-field shield serving to inhibit outward leakage of an electromagnetic-field formed in each board.

20 Claims, 8 Drawing Sheets

Related U.S. Application Data continuation of application No. 15/377,434, filed on Dec. 13, 2016, now Pat. No. 10,009,529, which is a continuation of application No. 14/823,492, filed on Aug. 11, 2015, now Pat. No. 9,554,022.

(51) Int. Cl.
  *B60R 11/04* (2006.01)
  *B60R 11/00* (2006.01)

(52) U.S. Cl.
  CPC .............. *H04N 5/2254* (2013.01); *B60R 1/00* (2013.01); *B60R 11/04* (2013.01); *B60R 2011/0001* (2013.01); *B60R 2300/806* (2013.01); *B60R 2300/8093* (2013.01)

(58) Field of Classification Search
  CPC ............. B60R 11/04; B60R 2011/0001; B60R 2300/806; B60R 2300/8093
  See application file for complete search history.

(56) References Cited

U.S. PATENT DOCUMENTS

| | | | |
|---|---|---|---|
| 8,861,951 B2 | 10/2014 | Warren et al. | |
| 8,985,454 B2 * | 3/2015 | Hyde | G06K 7/10 235/454 |
| 9,160,908 B2 | 10/2015 | Mori et al. | |
| 9,554,022 B2 | 1/2017 | Yang | |
| 9,621,769 B2 * | 4/2017 | Mai | H04N 5/2252 |
| 10,009,529 B2 | 6/2018 | Yang | |
| 2003/0089776 A1 | 5/2003 | Hennick et al. | |
| 2006/0171704 A1 | 8/2006 | Bingle et al. | |
| 2009/0244361 A1 | 10/2009 | Gebauer et al. | |
| 2009/0295983 A1 | 12/2009 | Sekimoto et al. | |
| 2010/0097519 A1 | 4/2010 | Byrne et al. | |
| 2011/0279675 A1 | 11/2011 | Mano et al. | |
| 2013/0027607 A1 | 1/2013 | Jeon et al. | |
| 2013/0242099 A1 | 9/2013 | Sauer et al. | |
| 2014/0168507 A1 | 6/2014 | Renaud | |
| 2014/0354878 A1 | 12/2014 | Winter et al. | |
| 2015/0029337 A1 | 1/2015 | Uchiyama et al. | |
| 2016/0178923 A1 | 6/2016 | Hayashi | |

FOREIGN PATENT DOCUMENTS

| | | |
|---|---|---|
| CN | 102611838 A | 7/2012 |
| CN | 103869580 A | 6/2014 |
| JP | H04-341516 A | 11/1992 |
| JP | 2001-075555 A | 3/2001 |
| JP | 2011-014809 A | 1/2011 |
| KR | 20-0252100 Y1 | 11/2001 |
| KR | 10-2013-0050767 A | 5/2013 |

OTHER PUBLICATIONS

Office Action dated Nov. 22, 2018 in Chinese Application No. 201510502063.1.
Office Action dated Jul. 23, 2020 in Korean Application No. 10-2014-0140847.
Office Action dated Jul. 23, 2019 in U.S. Appl. No. 15/991,729.
Office Action dated Feb. 21, 2020 in U.S. Appl. No. 15/991,729.
Notice of Allowance dated Jun. 9, 2020 in U.S. Appl. No. 15/991,729.
Office Action dated Sep. 21, 2020 in Chinese Application No. 201910959978.3.

* cited by examiner

CAMERA MODULE FOR USE IN AUTOMOBILE

CROSS-REFERENCE TO RELATED APPLICATIONS

This application is a continuation of U.S. application Ser. No. 15/991,729, filed May 29, 2018; which is a continuation of U.S. application Ser. No. 15/377,434, filed Dec. 13, 2016, now U.S. Pat. No. 10,009,529, issued Jun. 26, 2018; which is a continuation of U.S. application Ser. No. 14/823,492, filed Aug. 11, 2015, now U.S. Pat. No. 9,554,022, issued Jan. 24, 2017; which claims the benefit under 35 U.S.C. § 119 to Korean Patent Application No. 10-2014-0140847, filed Oct. 17, 2014, which are herein incorporated by reference in their entirety.

TECHNICAL FIELD

Embodiments relate to a sturdy camera module which is capable of inhibiting the generation of, for example, position deviation and damage due to external shocks and vibrations.

BACKGROUND

Camera modules having various use purposes may be mounted to an automobile. For example, a camera module, which can capture a rear view when parking an automobile, may be mounted to the back of an automobile.

In addition, recently a camera module may be used in an automobile black box, which is very useful to investigate, for example, the details and possible cause of a traffic accident. In addition, the case where a camera module is used as a recognition device to clearly and easily recognize the situation in blind spots, which where an automobile driver or passenger has difficulty in visually checking, is gradually increasing.

In recent years, the manufacture of a so-called smart car, i.e. an automobile equipped with, for example, a collision warning system, which anticipates the potential of front and rear collisions while the automobile is moving so as to inhibit the collisions, and a collision avoidance system in which a control device mounted in the automobile can directly avoid a collision between traveling automobiles without relying on a driver, is increasing and the development of associated technologies is increasing.

The use of a camera module that serves to recognize the state outside the smart car is increasing and, correspondingly, the production and technical development of a camera module for use in an automobile are increasing.

A camera module for use in an automobile may include a plurality of Printed Circuit Boards (PCBs) spaced apart from one another by a constant distance. Since the camera module including the printed circuit boards is mounted in a traveling automobile, the camera module is necessarily subjected to many shocks and vibrations due to external force compared to camera modules that are used for other purposes.

In particular, the printed circuit boards have a high risk of deviating from original positions thereof due to continuous external shocks and vibrations and, in addition, there is a high risk of damage to connectors that electrically connect the printed circuit boards to one another.

Therefore, there is a demand for a sturdy connection structure for circuit boards that is capable of inhibiting the occurrence of, for example, position deviation and damage to the printed circuit boards and the connectors for the same due to external shocks and vibrations.

BRIEF SUMMARY

Accordingly, embodiments provide a sturdy camera module which is capable of inhibiting the generation of, for example, position deviation and damage due to external shocks and vibrations.

In one embodiment, a camera module includes a lens unit, a first board formed with an electromagnetic circuit, a third board spaced apart from the first board, the third board including a terminal for external electrical connection and being formed with an electromagnetic circuit, a second board disposed between the first board and the third board and electrically connected to the first board and the third board, the second board being formed with an electromagnetic circuit, a first support member having one side coupled to the first board and the other side coming into contact with one surface of the second board, so as to maintain a constant distance between the first board and the second board, and a second support member having one side coupled to the second board and the first support member and the other side coming into contact with one surface of the third board, so as to maintain a constant distance between the second board and the third board.

In another embodiment, a camera module includes a lens unit, a first board formed with an electromagnetic circuit, a second board spaced apart from the first board, the second board including a terminal for external electrical connection and being formed with an electromagnetic circuit, a first support member having one side coupled to the first board and the other side coming into contact with one surface of the second board, so as to maintain a constant distance between the first board and the second board, and an electromagnetic-field shield configured to receive the first board and the second board, the electromagnetic-field shield serving to inhibit the outward leakage of an electromagnetic-field formed in each board.

In a further embodiment, a camera module includes a lens unit, a control circuit board configured to control the lens unit, a power supply circuit board disposed on the control circuit board and electrically connected to the control circuit board so as to supply electric power to the control circuit board, a support member having one side coupled to the control circuit board and the other side coming into contact with a lower surface of the power supply circuit board so as to maintain a constant distance between the control circuit board and the power supply circuit board, and a fastener configured to couple the power supply circuit board and the support member to each other.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
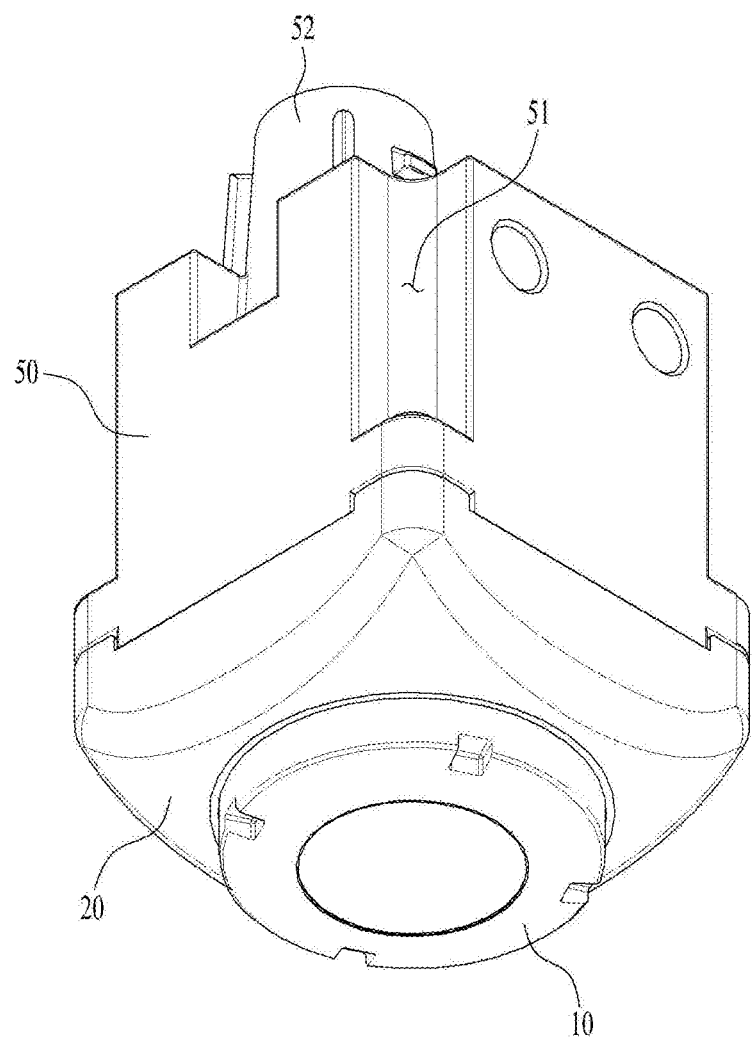
FIG. 1 is a perspective view illustrating a camera module according to one embodiment.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Figure 2:
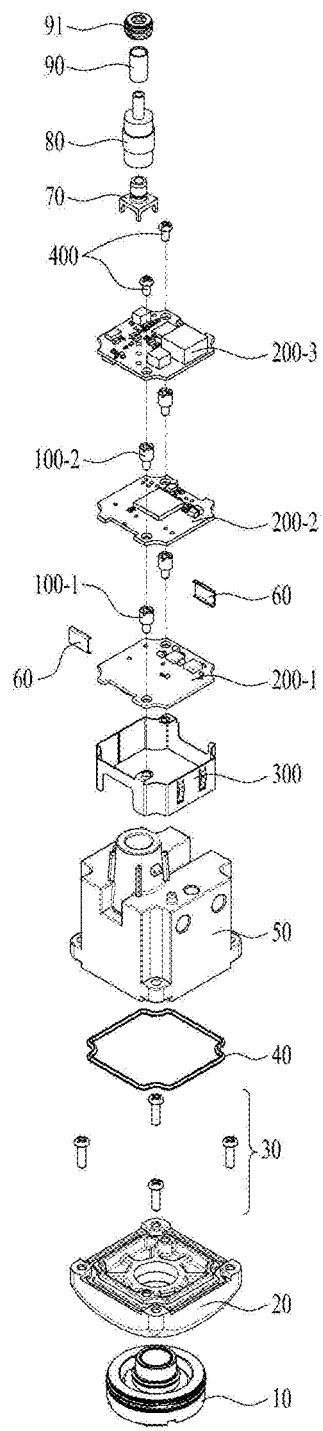
FIG. 2 is an exploded perspective view illustrating the camera module according to the embodiment.
Figure 3:
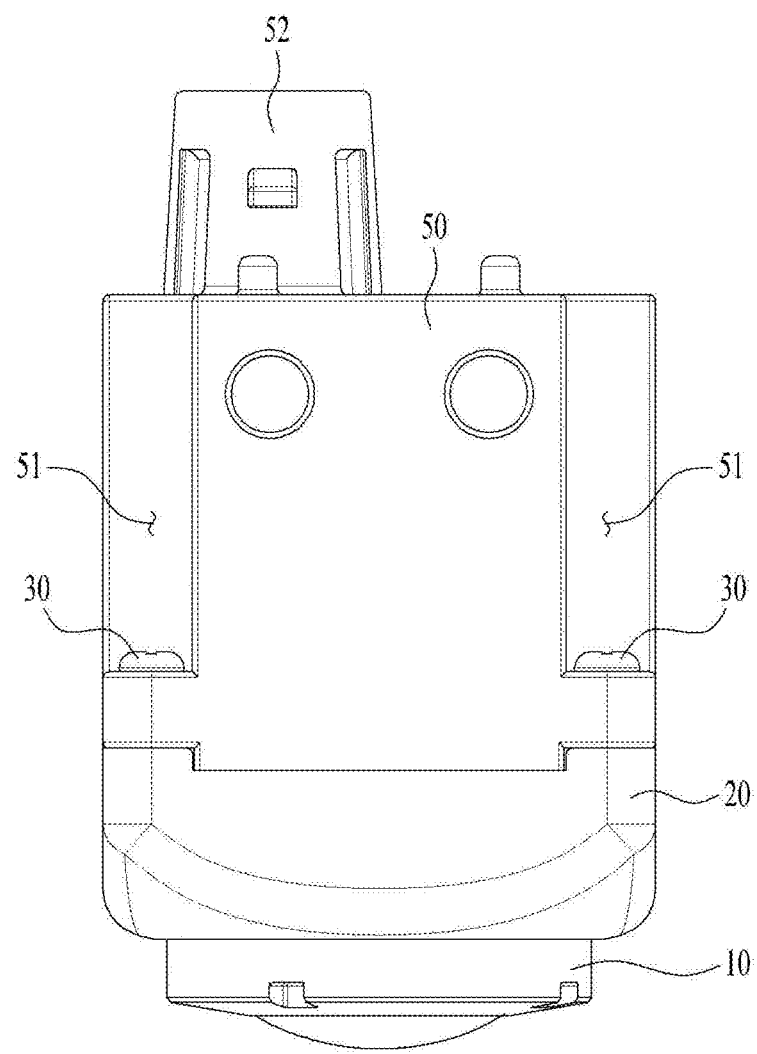
FIG. 3 is a side view illustrating the camera module according to the embodiment.

FIG. 1 is a perspective view illustrating a camera module according to one embodiment. FIG. 2 is an exploded perspective view illustrating the camera module according to the embodiment. FIG. 3 is a side view illustrating the camera module according to the embodiment.

The camera module may include a lens unit 10, a front cover 20, fasteners 30, a first sealing member 40, and a bracket 50.

The lens unit 10 serves to capture an image of an external object. Although not illustrated, the lens unit 10 may include, for example, a lens barrel, a lens moving device to move the lens barrel in a first direction for focusing, and a shaking correction device to control the movement of the lens barrel in a direction perpendicular to the first direction. At this time, the lens barrel may be a single lens, or may include a plurality of lenses arranged in the first direction.

In addition, the lens unit 10 is coupled to the front cover 20 via, for example, shape-fit or interference-fit. A sealing device may be provided to inhibit moisture, dust and other impurities from entering the camera module through a gap in a coupling region of the lens unit 10 and the front cover 20.

The lens unit 10 is mounted to a front portion of the front cover 20. To this end, the front portion of the front cover 20 may have a hollow region in which the lens unit 10 is mounted. The bracket 50 may be coupled to a rear portion of the front cover 20. For example, coupling of the front cover 20 and the bracket 50 may be implemented by the fasteners 30 as exemplarily illustrated in FIG. 2.

The fasteners 30 may serve to couple the front cover 20 and the bracket 50 to each other. For coupling of the fasteners 30, for example, as exemplarily illustrated in FIG. 3, the bracket 50 may be formed with holes and the front cover 20 may be formed with recesses at regions thereof corresponding to the holes of the bracket 50.

In the embodiment, since the bracket 50 is formed with the holes, the bracket 50 may also be formed with first avoidance recesses 51 for the fasteners 30. The first avoidance recesses 51 serve to assist the fasteners 30 in being easily coupled to the front cover 20 and the bracket 50. However, the first avoidance recesses 51 may be omitted when a coupling structure between the bracket 50 and the front cover 20 using the fasteners 30 is changed, or when the bracket 50 and the front cover 20 are coupled to each other without using the fasteners 30.

For example, when the fasteners 30 are coupled in a direction opposite to that as in the above-described embodiment, i.e. when the front cover 20 is formed with holes and the bracket 50 is formed with recesses such that the fasteners 30 are coupled from the holes of the front cover 20 to the recesses of the bracket 50, the first avoidance recesses 51 may be omitted.

In another embodiment, when the front cover 20 and the bracket 50 are coupled to each other via interference-fit or shape-fit without using the fasteners 30, the fasteners 30 are unnecessary and, therefore, the first avoidance recesses 51 may be omitted.

The first sealing member 40 may be located at a coupling region of the front cover 20 and the bracket 50 and serve to inhibit moisture, dust and other impurities from entering the camera module through a gap in the coupling region of the front cover 20 and the bracket 50.

For example, the first sealing member 40, as exemplarily illustrated in FIG. 2, may be a gasket, an O-ring, or any one of other appropriate members, which have an appropriate shape and size to be located in a region in which it can effectively block a gap in the coupling region of the front cover 20 and the bracket 50.

The bracket 50 is coupled to the front cover 20 and is configured to receive most constituent elements of the camera module so as to hermetically seal the constituent elements from the outside, thereby inhibiting damage to and malfunction of the received constituent elements of the camera module due to external shocks and inhibiting outside moisture, dust, and other impurities from entering the camera module.

The bracket 50 may be formed with the first avoidance recesses 51 for the fasteners 30 to assist the fasteners 30 in being easily coupled to the front cover 20 and the bracket 50. However, as described above, when the coupling structure of the front cover 20 and the bracket 50 is changed or when the front cover 20 and the bracket 50 are coupled to each other via interference-fit or shape-fit without using the fasteners 30, the first avoidance recesses 51 may be omitted.

A protrusion 52 may be formed at the back of the bracket 50. The protrusion serves to hermetically seal an external cable electrically connected to the camera module and a region for installation of the external cable. The protrusion 52 may be configured to receive a terminal 70, a cable (not illustrated) having one end electrically connected to the terminal 70, a cable penetration member 80, a bushing 90, and a second sealing member 91. Hereinafter, the aforementioned constituent elements will be described in detail.

The camera module may include connectors 60, the terminal 70, the cable penetration member 80, the bushing 90, and the second sealing member 91.

The connectors 60 may serve to implement electrical connection between a first board 200-1 and a second board 200-2 and electrical connection between the second board 200-2 and a third board 200-3. A detailed configuration of the connectors 60 will be described later.

The terminal 70 may be located to be coupled to the third board 200-3 that will be described below and serve to implement electrical connection with the outside of the camera module. Electric power is supplied from the cable connected to the terminal 70 to the third board 200-3 provided inside the camera module and, in turn, supplied to the second board 200-2 and the first board 200-1 which are electrically connected to the third board 200-3 via the connectors 60.

In addition, as the first board 200-1 is electrically connected to the lens unit 10, for example, the lens moving device and the shaking correction device included in the lens unit 10 as described above may be operated by the electric power supplied through the first board 200-1.

The cable penetration member 80 may take the form of a hollow member, such that a portion of the terminal 70 may be received in a hollow region and the cable connected to the terminal 70 may extend through the hollow region.

Meanwhile, the terminal 70 and the cable may be firmly coupled to inhibit short-circuit therebetween via, for example, soldering or bonding using an electrically conductive adhesive.

Coupling of the bushing 90 and the cable penetration member 80 may be implemented in such a manner that one side of the bushing 90 is fitted to the inner circumferential surface of the cable penetrating member 80 or one side of the cable penetrating member 80 is fitted to the inner circumferential surface of the bushing 90. In this way, the bushing 90 may serve to extend the cable penetration member 80.

Accordingly, the bushing 90 may have a hollow region in communication with the cable penetration member 80 and the cable may penetrate through the hollow region. Meanwhile, the bushing 90 may be omitted when the cable penetration member 80 is sufficiently long. Whether to additionally provide the bushing 90 or to use only the cable penetration member 80 may be appropriately selected in consideration of, for example, the size and shape of the camera module and the arrangement of constituent elements.

The second sealing member 91 may be located in a gap between an end of the bushing 90 or the cable penetration member 80 and the protrusion 52 of the bracket 50 and serve to inhibit moisture, dust, and other impurities from entering the camera module through the gap.

Accordingly, the second sealing member 91 may have an approximately cylindrical shape and may be fitted to come into close contact at the inner circumferential surface thereof with the outer circumferential surface of the bushing 90 or the cable penetration member 80 and to come into close contact at the outer circumferential surface thereof with the inner circumferential surface of the hollow region formed in the protrusion 52.

Figure 4A:
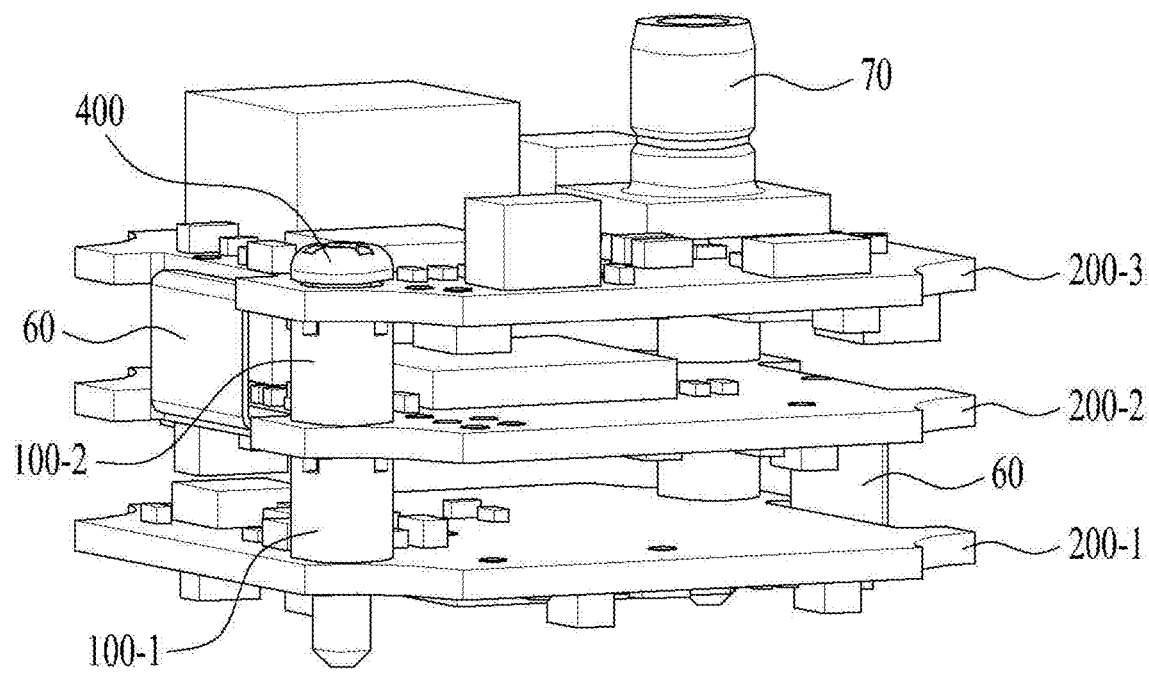
FIG. 4A is a perspective view illustrating part of the interior configuration of the camera module according to the embodiment.
Figure 4B:
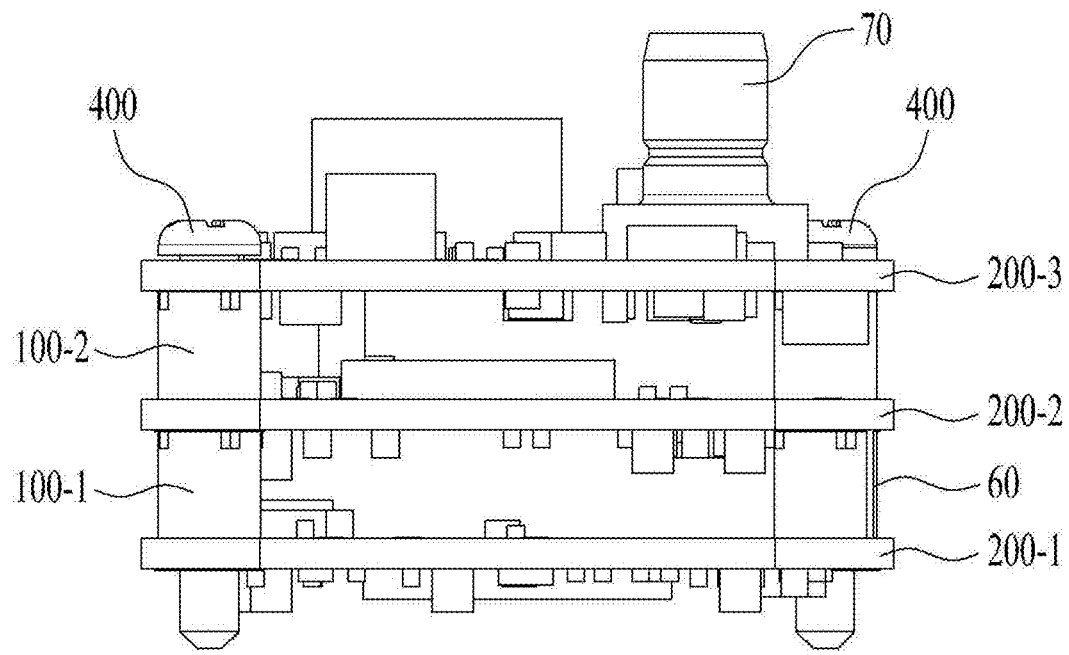
FIG. 4B is a side view illustrating part of the interior configuration of the camera module according to the embodiment.

FIG. 4A is a perspective view illustrating part of the interior configuration of the camera module according to the embodiment. FIG. 4B is a side view illustrating part of the interior configuration of the camera module according to the embodiment.

Figure 5:
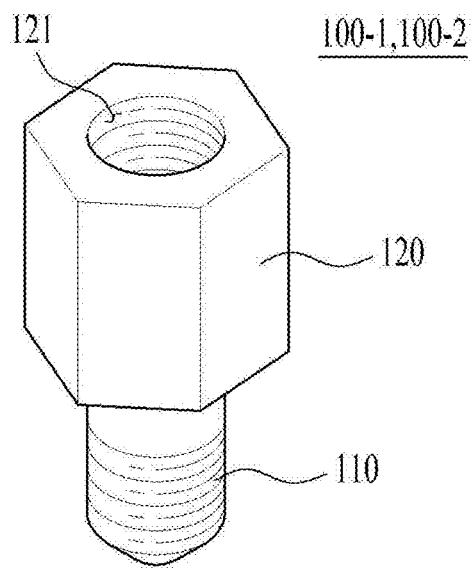
FIG. 5 is a perspective view illustrating a first support member or a second support member according to one embodiment.
Figure 6:
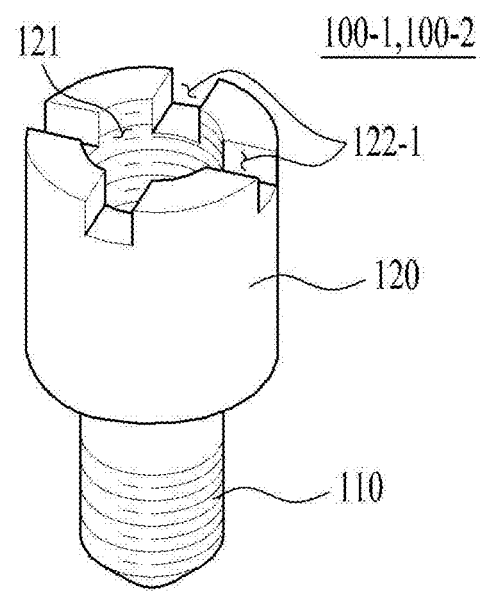
FIG. 6 is a perspective view illustrating a first support member or a second support member according to another embodiment.
Figure 7:
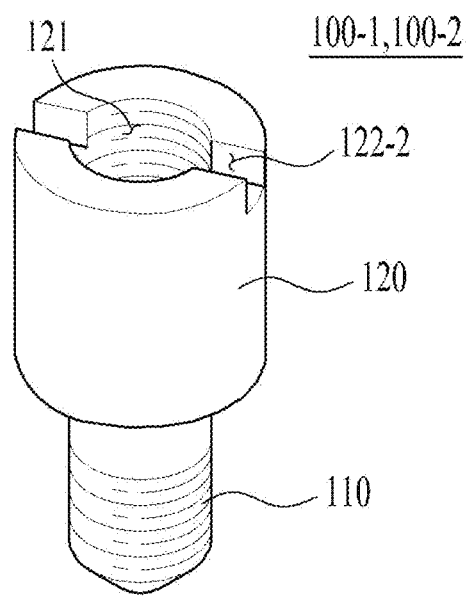
FIG. 7 is a perspective view illustrating a first support member or a second support member according to a further embodiment.

FIG. 5 is a perspective view illustrating a first support member 100-1 or a second support member 100-2 according to one embodiment. FIG. 6 is a perspective view illustrating the first support member 100-1 or the second support member 100-2 according to another embodiment. FIG. 7 is a perspective view illustrating the first support member 100-1 or the second support member 100-2 according to a further embodiment.

Figure 8:
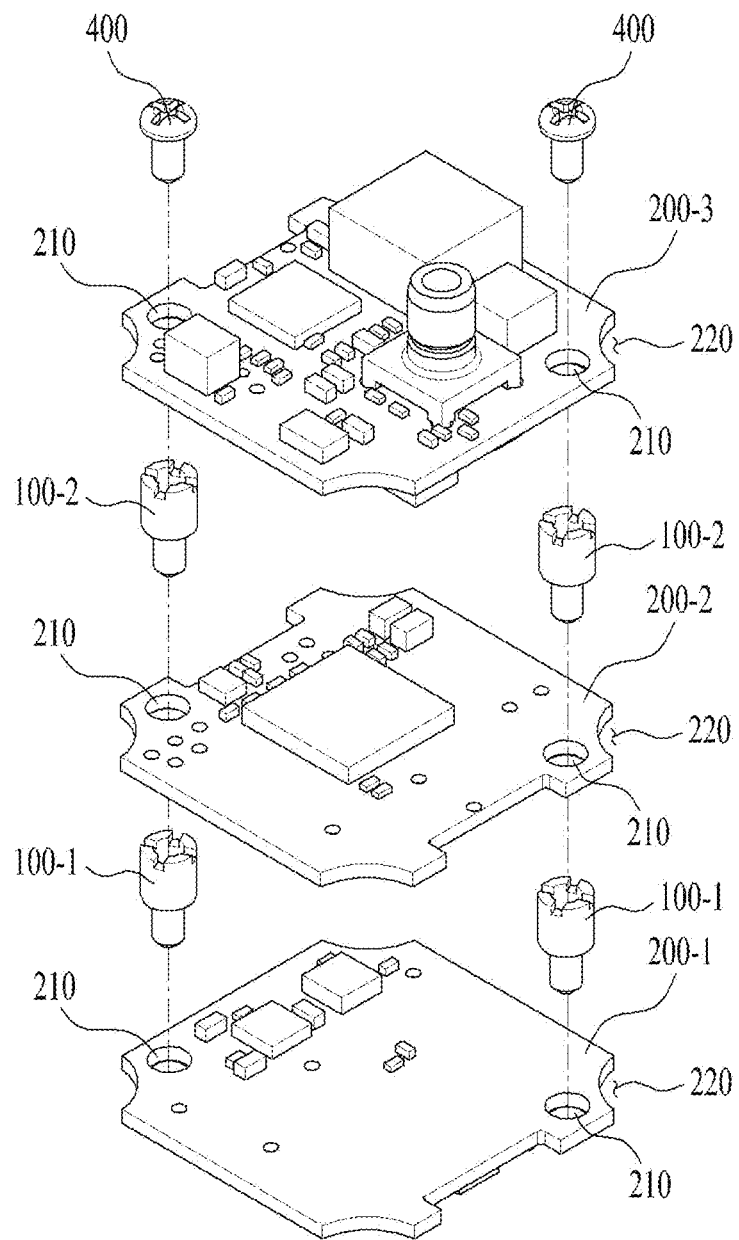
FIG. 8 is a view explaining a coupling structure of respective boards and support members of the camera module according to one embodiment.
Figure 9:
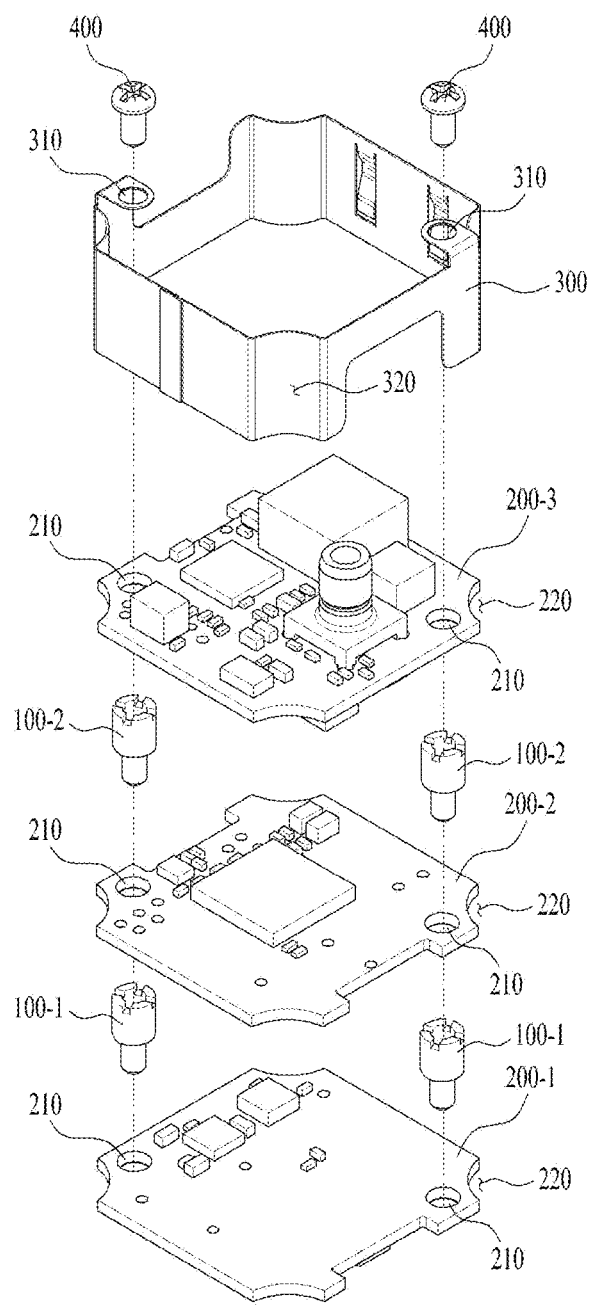
FIG. 9 is a view explaining a coupling structure of respective boards and support members of the camera module according to another embodiment.

FIG. 8 is a view explaining a coupling structure of the respective boards and the support members of the camera module according to one embodiment. FIG. 9 is a view explaining a coupling structure of the respective boards and the support members of the camera module according to another embodiment.

As exemplarily illustrated in FIGS. 4A and 4B, the first board 200-1, the second board 200-2, the third board 200-3, the first support member 100-1, the second support member 100-2, and the connectors 60 may be provided inside the camera module.

The first board 200-1 may be located close to the lens unit 10 and formed with an electromagnetic circuit including an image sensing unit (not illustrated). As the image sensing unit captures an image of an object transmitted through the lens unit 10, the first board 200-1 serves to convert the sensed image into electrical signals and to transmit the same to an external image storage device and/or image reproduction device. Note that conversion from the sensed image to the electrical signals may also be performed at the second board 200-2.

Meanwhile, the first board 200-1 may be formed with an electromagnetic circuit to control the lens unit 10. That is, the first board 200-1 may receive electric power from an external power supply through the cable, the third board 200-3, and the second board 200-2 to control the lens moving device and the shaking correction device of the lens unit 10.

The third board 200-3 may be spaced apart from the first board 200-1 by a given distance and include the terminal 70 for electrical connection with any external device and an electromagnetic circuit. The second board 200-2 may be located between the first board 200-1 and the third board 200-3 and be electrically connected to the first board 200-1 and the third board 200-3. The second board 200-2 may be formed with an electromagnetic circuit.

The second board 200-2 and the third board 200-3 may serve to supply electric power required for the first board 200-1 and to transmit electrical signals related to the sensed image transmitted from the first board 200-1 to the external image storage device and/or image reproduction device.

For example, the second board 200-2 may serve to convert the sensed image transmitted from the first board 200-1 into electrical signals so as to transmit the same to the external image storage device and/or image reproduction device, or may serve to rectify the electric power input from the third board 200-3 so as to transmit the same to the first board 200-1. That is, the second board 200-2 located at a middle position between the first board 200-1 and the third board 200-3 may partially share the roles of the first board 200-1 and the third board 200-3.

The third board 200-3 may mainly serve to supply electric power required for operation of the lens unit 10 and may also serve to transmit the electrical signals related to the sensed image transmitted from the first board 200-1 and the second board 200-2 to the external image storage device and/or image reproduction device.

Accordingly, several elements such as, for example, a condenser, a rectifier, and a transformer to supply electric power having an appropriate voltage and current required for operation of the lens unit 10 may be mounted to the third board 200-3. In addition, the terminal 70, which is coupled to the end of the cable as described above, may be mounted to the third board 200-3, for electrical connection with, for example, the external image storage device, image reproduction device, or camera module control device.

As described above, since elements occupying a given volume such as, for example, the condenser, the rectifier, the transformer, and the terminal 70, may be mounted or coupled to the first board 200-1, the second board 200-2, and the third board 200-3, there is required a device to provide a constant distance between the respective boards and to maintain the constant distance between the boards even when shocks and vibrations is applied to the camera module by external force.

The device as described above may be implemented by support members that are exemplified as the first support member 100-1 and the second support member 100-2 in the embodiments that will be described below. A detailed configuration of the support members will be described below.

Meanwhile, as exemplarily illustrated in FIGS. 8 and 9, the first board 200-1, the second board 200-2, and the third board 200-3 may be formed at corners thereof with second avoidance recesses 220. This is because the second avoidance recesses 20 need to have a shape corresponding to the first avoidance recesses 51 formed in the bracket 50 in order to allow the respective boards to be easily received in the bracket 50.

Accordingly, the second avoidance recesses 220 may be omitted because the first avoidance recesses 51 may be omitted when the formation of the first avoidance recesses 51 is unnecessary as described above, that is, when a coupling structure between the bracket 50 and the front cover 20 using the fasteners 30 is changed or when the bracket 50 and the front cover 20 are coupled to each other without using the fasteners 30.

Meanwhile, the respective boards may be printed circuit boards and may be manufactured into forms that allow the installation of the elements required on printed circuit boards. In addition, the respective boards may be formed with a strong material to maintain a constant distance therebetween even when shocks and vibrations are applied to the camera module by external force.

The connectors 60 may serve to electrically connect the respective boards to one another. For example, as exemplarily illustrated in FIG. 4A, the camera module may include the connector 60 to electrically connect the first board 200-1 and the second board 200-2 to each other and the connector 60 to electrically connect the second board 200-2 and the third board 200-3 to each other.

Although the embodiment illustrates that the connectors 60 for interconnection of the respective boards are provided one by one at lateral sides of the respective boards, the embodiment is not limited thereto and the number and arrangement positions of the connectors 60 may be selected in consideration of the circuit structure of the respective boards and the overall structure of the camera module.

The connectors 60 may be formed of a flexible material which ensures easy coupling between the respective boards and is capable of absorbing shocks and vibrations to inhibit the camera module from being broken by shocks and vibrations applied from the outside of the camera module. As such, the connectors 60 may be configured as flexible circuit boards.

Note that the embodiment is not limited to the above description and the connectors 60 may be formed using any other strong materials so long as they are resistant to shocks and vibrations, or may be formed using a bundle of electric wires. In addition, for example, soldering, adhesion using an electrically conductive adhesive, shape-fit, or interference-fit may be used. These connectors 60 may serve as B2B (board-to-board) connectors that electrically connect the respective boards to one another.

One side of the first support member 100-1 is coupled to the first board 200-1 and the other side of the first support member 100-1 comes into contact with one surface of the second board 200-2. As such, the first support member 100-1 may serve to maintain a constant distance between the first board 200-1 and the second board 200-2.

One side of the second support member 100-2 is coupled to the second board 200-2 and the first support member 100-1 and the other side of the second support member 100-2 comes into contact with one surface of the third board 200-3. As such, the second support member 100-2 may serve to maintain a constant distance between the second board 200-2 and the third board 200-3.

The first support member 100-1 and the second support member 100-2 may have the same detailed shape except that the first support member 100-1 is used to maintain a constant distance between the first board 200-1 and the second board 200-2 and the second support member 100-2 is used to maintain a constant distance between the second board 200-2 and the third board 200-3 and that the first support member 100-1 and the second support member 100-2 are arranged at different positions. Thus, the detailed configuration of the first support member 100-1 and the second support member 100-2 having the same shape will be described below.

The support member, which is a common name of the first support member 100-1 and the second support member 100-2, may include a small diameter portion 110 and a large diameter portion 120. The small diameter portion 110 may be narrower than the large diameter portion 120 in the width direction and may be formed at the outer circumferential surface thereof with male threads.

The large diameter portion 120 may have a central coupling recess 121 which is formed with female threads corresponding to the male threads to enable the screwing of the small diameter portion 110. As such, the small diameter portion 110 of one support member may be screwed to the coupling recess 121 of the large diameter portion 120 of another support member.

In one embodiment, as exemplarily illustrated in FIG. 5, the large diameter portion 120 may have a hexagonal cross section in the width direction. This serves to allow the small diameter portion 110 of one support member to be screwed to an insertion region 210 of each board or the coupling recess 121 of another support member using tools such as, for example, a wrench.

In another embodiment, as exemplarily illustrated in FIG. 6, the large diameter portion 120 may have a circular cross section in the width direction. The large diameter portion 120 may include a cross-shaped indentation 122-1 formed at one end in the width direction to pass through the center of the large diameter portion 120. This serves to allow the small diameter portion 110 of one support member to be screwed to the insertion region 210 of each board or the coupling recess 121 of another support member using tools such as, for example, a Phillips screwdriver.

In a further embodiment, as exemplarily illustrated in FIG. 7, the large diameter portion 120 may have a circular cross section in the width direction. The large diameter portion 120 may include a linear indentation 122-2 formed at one end in the width direction to pass through the center of the large diameter portion 120. This serves to allow the small diameter portion 110 of one support member to be screwed to the insertion region 210 of each board or the coupling recess 121 of another support member using tools such as, for example, a linear screwdriver.

Although the several embodiments of the large diameter portion 120 or the indentation have been described above, the large diameter portion 120 or the indentation is not limited thereto and may have various shapes according to the kinds of tools for the screwing of the support members.

Meanwhile, as exemplarily illustrated in FIGS. 8 and 9, the first board 200-1, the second board 200-2, and the third board 200-3 may be formed at corresponding positions with the insertion regions 210 for insertion of the small diameter portions 110 of the first support members 100-1 or the second support members 100-2. In one embodiment, as exemplarily illustrated in FIG. 9, the insertion region 210 may take the form of a through-hole.

In another embodiment, the insertion region 210 may take the form of a recessed hole, at least a portion of which is open. The recessed hole means the insertion region 210 formed at the edge of each board. The recessed hole defines a perforated hole in the vertical direction of each board and partially merges with the end of the board in the lateral direction such that a portion of the recessed hole is open.

FIG. 8 is a view explaining a coupling structure between the respective boards and the support members of the camera module according to one embodiment. As exemplarily illustrated in FIG. 8, the first board 200-1, the second board 200-2, and the third board 200-3 may be spaced apart from one another, the first support members 100-1 may be located between the first board 200-1 and the second board 200-2, and the second support members 100-2 may be located between the second board 200-2 and the third board 200-3.

Meanwhile, in the embodiment, a fastener 400 may be provided to couple the third board 200-3 and each second support member 100-2 to each other. The fastener 400 may pass through the insertion region 210 formed in the third board 200-3 such that one end thereof is fastened to the coupling recess 121 formed in the large diameter portion 120. The fastener 400 may be a screw, a coupling pin, and any one of various other shapes.

With this configuration, the small diameter portion 110 of the first support member 100-1 is screwed to the insertion region 210 of the first board 200-1, the small diameter portion 110 of the second support member 100-2 is screwed to the large diameter portion 120 of the first support member 100-1, the second board 200-2 is disposed between the large diameter portion 120 of the first support member 100-1 and the large diameter portion 120 of the second support member 100-2, and the first support member 100-1, the second support member 100-2, and the fastener 400 are fastened to one another. In this way, a coupling structure of the respective boards, the respective support members, and the fastener 400 is completed.

The first board 200-1, the second board 200-2, and the third board 200-3 are spaced apart from one another by a constant distance by the first support member 100-1, the second support member 100-2, and the fastener 400. The resulting firm coupling structure may inhibit the respective boards from deviating from given positions due to external shocks and vibrations.

Meanwhile, the first support member 100-1 or the second support member 100-2 may be electrically connected to a ground wire. At this time, the ground wire may be one of a plurality of cables coupled to the terminal 70. As the ground wire is connected to the first support member 100-1 or the second support member 100-2, it is possible to inhibit short-circuit and damage to the respective boards due to a sudden voltage surge that may occur in the respective boards.

FIG. 9 is a view explaining a coupling structure of respective boards and support members of the camera module according to another embodiment. In the embodiment, as exemplarily illustrated in FIG. 9, an electromagnetic-field shield 300 is added compared to the embodiment illustrated in FIG. 8.

The electromagnetic-field shield 300 may be configured to receive the first board 200-1, the second board 200-2, and the third board 200-3 and may serve to inhibit the outward leakage of an electromagnetic-field formed in each board. The electromagnetic-field shield 300 may be coupled to the third board 200-3 using the fastener 400 and disposed inside the camera module.

To this end, the electromagnetic-field shield 300 may be formed with through-holes 310, into which the fasteners 400 are fastened respectively to couple the electromagnetic-field shield 300 and the third board 200-3 to each other. As such, each fastener 400 may pass through the through-hole 310 and the insertion region 210 formed in the third board 200-3 such that one end thereof is fastened to the coupling recess 121 formed in the large diameter portion 120 of the second support member 100-2.

The electromagnetic-field shield 300 may be formed with third avoidance recesses 320. This is because the electromagnetic-field shield 300 needs to have a shape corresponding to the first avoidance recesses 51 formed in the bracket 50 and the second avoidance recesses 220 corresponding thereto, in order to allow the respective boards to be easily received in the bracket 50.

Accordingly, when it is unnecessary to form the first avoidance recesses 51 as described above, that is, when a coupling structure of the bracket 50 and the front cover 20 using the fasteners 30 is changed, or when the bracket 50 and the front cover 20 are coupled to each other without using the fasteners 30, the first avoidance recesses 51 may be omitted and, in this case, the third avoidance recesses 320 may be omitted.

Meanwhile, in another embodiment of the camera module including two boards, a coupling structure similar to that as described above may be formed.

For example, when a control circuit board to control the lens unit 10 and a power supply circuit board to supply electric power to the control circuit board are mounted in the camera module, according to the embodiment, there may be provided a coupling structure which is similar to an assembly of the first board 200-1, the third board 200-3, the second support members 100-2, and the fasteners 400 except for the second board 200-2 and the first support member 100-1.

That is, a coupling structure, in which two boards are firmly coupled to each other so as to be spaced apart from each other by a constant distance, may be formed using the control circuit board, the power supply circuit board, the support members, and the fasteners 400. At this time, only one connector 60 may be provided unlike the above-described embodiment. In addition, it is natural that the electromagnetic-field shield 300 may be disposed similar to that of the above embodiment.

In addition, it is natural that a regular and firm coupling structure of the respective boards, similar to that of the above-described embodiment, may be formed even when four or more boards are arranged at a constant distance.

As is apparent from the above description, according to the embodiments, respective boards are firmly coupled to one another using support members and fasteners so as to be arranged at a constant distance, which has the effect of improving the coupling force between the respective boards.

In addition, owing to this firm coupling structure, the respective boards maintain a constant distance therebetween, rather than deviating from given positions, even if external shocks or vibrations are continuously applied thereto, which has the effect of inhibiting damage to the boards and the malfunction of a camera module.

In addition, the respective support members may be manufactured to have various lengths, which has the effect of enabling the easy adjustment of the distance between the respective boards.

In addition, through the easy adjustment of the distance between the respective boards, it is possible to provide connectors for electrical connection between the respective boards with an assembly tolerance to inhibit the connectors from being tightly coupled to the respective boards, which has the effect of inhibiting damage to the connectors and short-circuit due to external shocks or vibrations.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module, comprising:
a lens unit;
a first board;
a second board spaced apart from the first board; and
a first support member maintaining a constant distance between the first board and the second board, and supporting the first board,
wherein the first support member is configured to support the first board such that an upper surface thereof is parallel to an upper surface of the second board,
wherein the first board comprises a first corner and a second corner opposite to each other, each of the first corner and the second corner of the first board comprising a first avoidance recess that is recessed towards a center of the first board,
wherein the second board comprises a third corner and a fourth corner opposite to each other, each of the third corner and the fourth corner of the second board comprising a second avoidance recess that is recessed towards a center of the second board,
wherein the first board comprises a first through hole adjacent to a first lateral edge of the first board and a second through hole adjacent to a second lateral edge of the first board opposite to the first lateral edge of the first board,
wherein the second board comprises a third through hole corresponding to the first through hole, and a fourth through hole corresponding to the second through hole,
wherein the first support member comprises one first support member and an other first support member,
wherein a position of the one first support member corresponds to the first through hole and the third through hole, and
wherein a position of the other first support member corresponds to the second through hole and the fourth through hole.

2. The camera module according to claim 1, wherein the first support member comprises a first diameter portion contacted to a lower surface of the first board opposite to the upper surface of the first board and a second diameter portion contacted to the upper surface of the second board.

3. The camera module according to claim 2, comprising:
a terminal located on the upper surface of the first board, and
a fastener comprising a first portion contacting to the upper surface of the first board and second portion inserted to a hole of the first support member.

4. The camera module according to claim 1, wherein each of the one first support member and the other first support member comprises a first diameter portion contacted to a lower surface of the first board opposite to the upper surface of the first board and a second diameter portion contacted to the upper surface of the second board.

5. The camera module according to claim 4, wherein the second diameter portion of the one first support member is inserted into the third through hole of the second board, and
wherein the second diameter portion of the other first support member is inserted into the fourth through hole of the second board.

6. The camera module according to claim 4, wherein a diameter of the first diameter portion is greater than a diameter of the second diameter portion.

7. The camera module according to claim 6, wherein the first diameter portion has a circular cross section in a width direction.

8. The camera module according to claim 6, wherein the first diameter portion has a linear indentation formed at an end in a width direction so as to pass through a center of the first diameter portion.

9. The camera module according to claim 6, wherein the first diameter portion has a cross-shaped indentation formed at an end in a width direction so as to pass through a center of the first diameter portion.

10. The camera module according to claim 6, wherein the first diameter portion has a hexagonal cross section in a width direction.

11. The camera module according to claim 6, wherein the second board is formed at a corresponding position thereof with an insertion region for insertion of the second diameter portion.

12. The camera module according to claim 1, comprising a connector configured to implement electrical connection between the first board and the second board.

13. The camera module according to claim 12, wherein the connector is configured as a flexible circuit board.

14. A camera module, comprising:
a lens unit;
a first board;
a second board spaced apart from the first board;
a first support member maintaining a constant distance between the first board and the second board, and supporting the first board;
a third board spaced apart from the second board; and
a second support member maintaining a constant distance between the second board and the third board, and supporting the second board,
wherein the first board comprises a first corner and a second corner opposite to each other, each of the first corner and the second corner of the first board comprising a first avoidance recess that is recessed towards a center of the first board, wherein the second board comprises a third corner and a fourth corner opposite to each other, each of the third corner and the fourth corner of the second board comprising a second avoidance recess that is recessed towards a center of the second board, wherein the first board comprises a first through hole adjacent to a first lateral edge of the first board and a second through hole adjacent to a second lateral edge of the first board opposite to the first lateral edge of the first board, wherein the second board comprises a third through hole corresponding to the first through hole, and a fourth through hole corresponding to the second through hole, wherein the first support member comprises one first support member and an other first support member, wherein a position of the one first support member corresponds to the first through hole and the third through hole, and wherein a position of the other first support member corresponds to the second through hole and the fourth through hole.

15. The camera module according to claim 14, wherein the third board comprises a fifth corner and a sixth corner opposite to each other, each of the fifth corner and the sixth corner of the third board comprising a third avoidance recess that is recessed towards a center of the third board.

16. The camera module according to claim 15, wherein the second support member comprises one second support member and an other second support member, wherein a position of the one second support member corresponds to the third through hole and the fifth through hole, and wherein a position of the other second support member corresponds to the fourth through hole and the sixth through hole.

17. The camera module according to claim 1, wherein the first support member is electrically connected to a ground wire.

18. The camera module according to claim 1, wherein the first support member is in direct physical contact with the upper surface of the second board.

19. The camera module according to claim 3, comprising an electromagnetic-field shield configured to receive the first board and the second board therein, the electromagnetic-field shield serving to inhibit outward leakage of an electromagnetic-field formed in each board.

20. The camera module according to claim 19, wherein the electromagnetic-field shield is formed with a through-hole for coupling of the fastener such that the electromagnetic-field shield and the first board are coupled to each other via the fastener.

* * * * *